Aug. 7, 1951        R. J. GORDON                2,563,031
                     LAWN EDGER
                  Filed Dec. 22, 1947
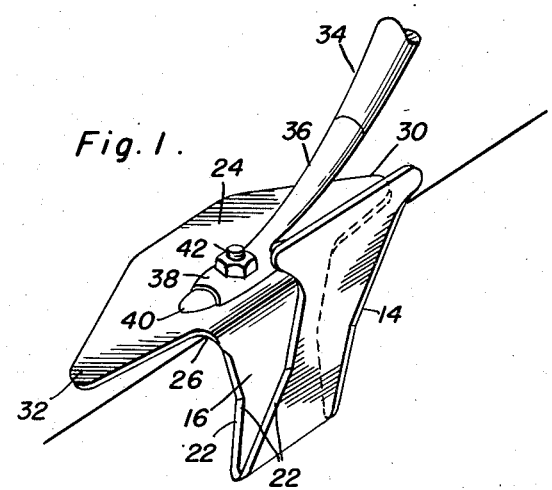
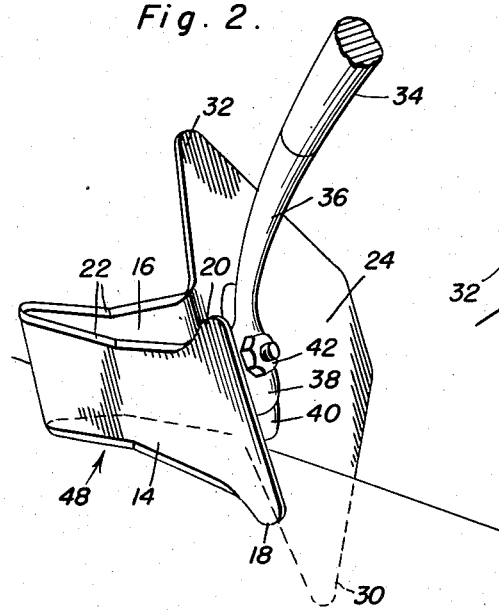
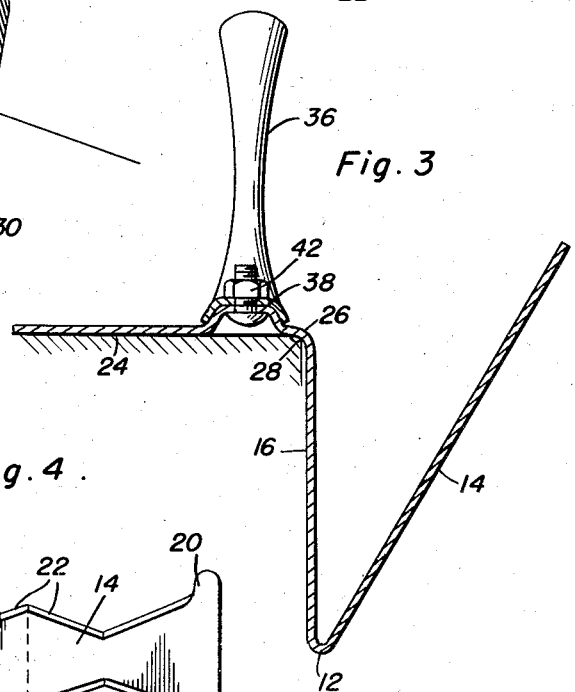
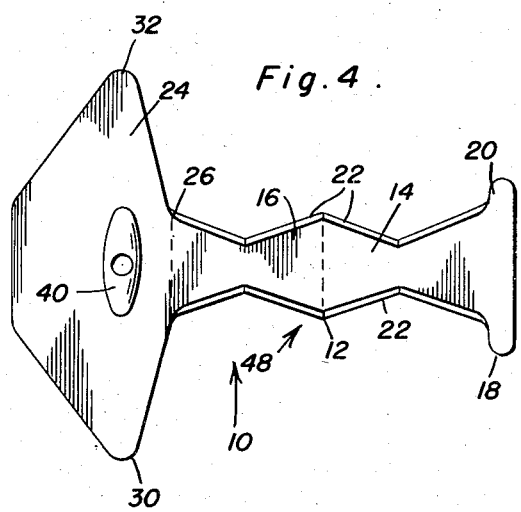
Robert J. Gordon
INVENTOR.
BY *Clarence A. O'Brien*
*and Harvey B. Jacobson*
Attorneys Patented Aug. 7, 1951

2,563,031

UNITED STATES PATENT OFFICE 2,563,031

LAWN EDGER

Robert J. Gordon, Boise, Idaho

Application December 22, 1947, Serial No. 793,285

4 Claims. (Cl. 97—227)

1

This invention relates to a garden tool or implement and has for its principal object to cut a uniform trough or trench in the sod or lawn adjacent the edge of the sidewalks, walks or curbings.

Another object of this invention is to keep the edge of the sod properly trimmed and the adjoining trough free from dirt, weeds or grass.

Another object of this invention is to cut a trough or trench in the lawn or sod in correct parallelism with the walk so as to greatly improve the appearance of the lawn and sidewalk.

Another object of this invention is to form such a trench or trough in positions where previously, due to a wall or other obstruction, it was impossible to edge the walk up to the obstruction or wall.

A further object of this invention is to provide a garden tool adapted to form a trim and neat edge or trough in the lawn adjacent the edge of the sidewalk, which is simple and inexpensive to manufacture, and of a durable construction, and efficient in operation so that an operator may rapidly and conveniently by pushing or pulling the device along the edge of the sidewalks, walks or curbings, form a uniform, neat and straight trench along the side walks.

With these and other ancillary objects and meritorious features in mind, this invention consists of novel parts and arrangement and construction thereof, as will be more clearly described in the accompanying description and as exemplified in the accompanying drawings, wherein:

Figure 1 is a perspective view of the device, exemplifying the cutter portion in operation for forming a uniform trench in the lawn;

Figure 2 is a perspective side elevational view of the device, showing the cleaning toe in use;

Figure 3 is a cross-sectional view of the implement, as shown generally in Figure 1, and Figure 4 is a plan structural view of the blank employed to form the cutter and guide portions.

In carrying out this invention, there is provided a blank, generally denoted by the reference character 10, as shown in Figure 4 of the drawings. This blank 10 is bent on a line 12 to form the two upwardly extending opposed sides 14 and 16 on the V-shaped cutter 48. One of the upstanding sides 14 terminates outwardly in arcuate shoulders 18 and 20 formed on each side adjacent the end thereof. Angular cutting edges 22 are formed on each side of the V-shaped cutter 48.

The other end 24 of the blank 10 is triangular in shape and is bent horizontally of the side 16 of the V-shaped cutter. This semi-triangular end portion or guide plate 24 is bent on the line 26 at right angles to the side 16 of the V-shaped cutter 48. An arcuate shoulder 28, formed in the underside of the angular juncture point between the sides 16 on the cutter and the guide plate 24 abuts the edge of the sidewalk, as shown in Figure 3 of the drawings. Oppositely disposed toe sections 32 and 30 are formed on the ends of the guide plate 24 and are adapted to remove any foreign particles, such as rocks, weeds or grass from the ditch or trough, after the V-shaped cutter has formed the trough, as shown in Figure 2 of the drawings.

A reversible handle 34 is provided to push or pull the implement along the edge of the sidewalks. This handle 34 terminates in an inwardly curved and outwardly extending shank 36, having a concave ear 38 formed at the terminating point thereof. This ear 38 forms a section of the concave and convex joint. A raised elliptical portion 40 is formed on the upper surface of the guide plate 24 midway between the opposing ear ends 30 and 32 and adjacent to the arcuate shoulder or bend 26. Suitable apertures are formed in the raised portion and in the head surface of the U-shaped ear or concave end of the handle and conventional means, such as a nut and bolt 42 is employed to secure the parts together and to form the half round concave and convex joint.

In operation, the implement or garden tool is utilized by pushing or pulling the same along the sidewalk. An operator grasps the handle 34 adjacent its upper end and starting at any desired point positions the V-shaped cutter 18 in the lawn or sod, with the arcuate shoulder 26 abutting the edge of the sidewalk and the guide plate 24 overlying the sidewalk, to facilitate the formation of a uniform and straight edge or groove. The lawn or sod removed by the cutter is held within the opposed surfaces of the upstanding sides 14 and 16 and is removed from the trough, by pulling the handle and the pertinent implement upward to deposit the soil on the sidewalk or any other suitable place.

After a uniform trough or neatly shaped edge has been formed in the lawn adjacent the sidewalk, the tool is then turned so that one of the cleaning toes 30 or 32 is positioned within the trough that has been cut and by pulling or pushing the implement, the toe cleans the remaining particles of dirt from the trough leaving the trough clean and smooth. During the employment of the cleaning toe 32 or 30, the cutting edges of the cutter 48 are spaced from contact with the concrete of the sidewalk by means of the arcuate shoulders 18 or 20 formed integrally on one end thereof.

Where a sidewalk or curbing terminates against a wall or other obstruction, the handle 34 can be conveniently reversed to edge the walk up to the wall.

It can thus be seen that there is provided a durable and economical garden tool adapted to cut a uniform trough that greatly improves the appearance of the lawn and sidewalks, to clean the trough or particles of grass and dirt by means of the cleaning toes and to thereby simplify and render more convenient a homeowner's task of keeping his lawn borders neat and clean and preventing the grass from growing over the side edges of the sidewalk.

Of course, the implement could be provided with a handle formed integrally with the guide plate and the consequent obviating of the reversibility of the handle with the guide plate, for all-around use in lawns or gardens where there are no obstructions and where the walks do not terminate against the side of a building or against the obstructions. Of course, it is to be understood that this description and the accompanying drawings refer to only one embodiment of the garden implement and that various changes in size, style or assemblage of parts may be made without any departure from the spirit of the invention and within the scope of the appended claims.

Having described the invention what is claimed as new is:

1. A gardening implement for forming a uniform trough in the lawn adjacent a sidewalk comprising a plate adapted to be slidably disposed on a sidewalk, said plate including an enlarged central section and opposing tapered end sections, a handle reversibly secured to the upper surface of the central section by means of a concavo-convex locking joint, a lateral extension integrally formed on one of the side edges of the central section, said extension being bent intermediate its ends to form a V-shaped cutter, said cutter being disposed below the upper surface of the plate and formed with opposing notched cutting edges, and a transversely enlarged unattached end on said cutter, said end having rounded extremities adapted to slidably engage on a sidewalk, when one of the ends of the plate is disposed in the trough.

2. A gardening implement comprising a plate bent to form a V-shaped cutter and having a laterally and outwardly extending guide plate formed at one end of the cutter, oppositely disposed toe portions formed on each end of the guide plate, the other end of the V-shaped cutter being transversely enlarged and having rounded extremities adapted to slidably engage on a sidewalk when one of the toe portions extends downwardly along a side edge thereof, and a handle secured to the plate.

3. A gardening implement comprising a head, said head being formed from an integral plate having an axis of symmetry, said plate being bent transverse said axis to form a V-shaped cutter and also being bent transverse said axis to form a guide plate extending outwardly from one of the ends of the cutter, tapered, oppositely extending toe portions integral with the guide plate, and rounded, oppositely extending guides adjacent and integral with the other end of the cutter.

4. A gardening implement comprising a head having a plane of symmetry, said head comprising a plate bent to form a V-shaped cutter and having a laterally and outwardly extending guide plate formed at one end of the cutter, oppositely disposed toe portions formed on each end of the guide plate, the other end of the V-shaped cutter being transversely enlarged and having rounded extremities adapted to slidably engage on a sidewalk when one of the toe portions extends downwardly along a side edge thereof, a handle, means for securing a handle to the head in angularly adjustable relation thereto.

ROBERT J. GORDON.

REFERENCES CITED

The following references are of record in the file of this patent:

UNITED STATES PATENTS

| Number | Name | Date |
|---|---|---|
| 97,863 | Billings | Dec. 14, 1869 |
| 908,266 | Jackson | Dec. 29, 1908 |
| 1,060,445 | Fields | Apr. 29, 1913 |
| 1,139,978 | Imhof et al. | May 18, 1915 |
| 1,438,095 | Clark | Dec. 5, 1922 |
| 1,633,318 | Drish | June 21, 1927 |
| 1,823,254 | Casse | Sept. 15, 1931 |

FOREIGN PATENTS

| Number | Country | Date |
|---|---|---|
| 769,892 | France | June 18, 1934 |